US011407427B2

(12) United States Patent
Sato

(10) Patent No.: US 11,407,427 B2
(45) Date of Patent: Aug. 9, 2022

(54) DRIVING CONTROL APPARATUS FOR VEHICLE

(71) Applicant: SUZUKI MOTOR CORPORATION, Hamamatsu (JP)

(72) Inventor: Katsuhiko Sato, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 122 days.

(21) Appl. No.: 17/030,339

(22) Filed: Sep. 23, 2020

(65) Prior Publication Data

US 2021/0094575 A1    Apr. 1, 2021

(30) Foreign Application Priority Data

Sep. 26, 2019 (JP) .............................. JP2019-175866

(51) Int. Cl.
*B60W 60/00* (2020.01)
*B60W 30/095* (2012.01)
(Continued)

(52) U.S. Cl.
CPC ........ *B60W 60/0015* (2020.02); *B60W 10/18* (2013.01); *B60W 10/20* (2013.01);
(Continued)

(58) Field of Classification Search
CPC ........... B60W 60/0015; B60W 60/005; B60W 10/18; B60W 10/20; B60W 30/0956;
(Continued)

(56) References Cited

U.S. PATENT DOCUMENTS

| 8,577,553 B2 | 11/2013 | Nitta et al. |
| 8,700,299 B2 | 4/2014 | Morita et al. |

(Continued)

FOREIGN PATENT DOCUMENTS

| DE | 102016009709 | 2/2017 |
| FR | 3094316 | 10/2020 |

(Continued)

OTHER PUBLICATIONS

Office Action dated Jun. 29, 2021 issued in U.S. Appl. No. 16/783,912.
(Continued)

*Primary Examiner* — Jason Holloway
(74) *Attorney, Agent, or Firm* — Cozen O'Connor

(57) ABSTRACT

Vehicle driving control apparatus having function for performing automated in-lane driving by maintaining a vehicle speed when no preceding vehicle is in driving lane, and maintaining an inter-vehicle distance when a preceding other vehicle exists, function for performing automated lane change when there is no other vehicle in a predetermined area of neighboring lane, a function for notifying a driver of stopping the functions and an operation takeover request when a system failure occurs, function for evacuating vehicle to road shoulder when driver cannot resume operation, wherein, when vehicle is not in first lane neighboring road shoulder at operation of evacuating function, lane change from in-lane driving maintaining set inter-vehicle distance or set vehicle speed to first lane is performed, and prior thereto, a predetermined area serving as criterion of lane change to first lane is changed to a second area smaller than area of automated lane change.

4 Claims, 9 Drawing Sheets

(51) Int. Cl.
  *B60W 30/12* (2020.01)
  *B60W 30/14* (2006.01)
  *B60W 30/16* (2020.01)
  *B60W 10/18* (2012.01)
  *B60W 10/20* (2006.01)
  *B60W 30/18* (2012.01)
  *B60W 50/10* (2012.01)
  *B60W 50/14* (2020.01)

(52) U.S. Cl.
  CPC ........ *B60W 30/0956* (2013.01); *B60W 30/12* (2013.01); *B60W 30/146* (2013.01); *B60W 30/162* (2013.01); *B60W 30/18163* (2013.01); *B60W 50/10* (2013.01); *B60W 50/14* (2013.01); *B60W 60/0061* (2020.02)

(58) Field of Classification Search
  CPC .. B60W 30/12; B60W 30/146; B60W 30/162; B60W 30/18163; B60W 50/10; B60W 50/14; B60W 60/0061; B60W 50/12; B60W 2540/12; B60W 2540/20; B60W 2720/10; B60W 30/143; B60W 30/16; B60W 60/0053; B60W 10/04; B60Y 2302/05
  See application file for complete search history.

(56) References Cited

U.S. PATENT DOCUMENTS

| | | | |
|---|---|---|---|
| 9,308,914 | B1 | 4/2016 | Sun et al. |
| 9,637,107 | B2 | 5/2017 | Matsuno et al. |
| 9,665,779 | B2 | 5/2017 | Ooi |
| 9,775,004 | B2 | 9/2017 | Cawse et al. |
| 9,809,164 | B2 | 11/2017 | Matsuno et al. |
| 10,001,781 | B2 | 6/2018 | Nakamura et al. |
| 10,365,115 | B2 | 7/2019 | Nair et al. |
| 10,589,786 | B2 | 3/2020 | Fujii |
| 10,704,301 | B2 | 7/2020 | Kim et al. |
| 10,839,689 | B2 | 11/2020 | Mizoguchi |
| 2005/0015203 | A1 | 1/2005 | Nishira |
| 2005/0104745 | A1 | 5/2005 | Bachelder et al. |
| 2005/0187701 | A1 | 8/2005 | Baney |
| 2005/0216172 | A1 | 9/2005 | Schroder |
| 2009/0167561 | A1 | 7/2009 | Liang |
| 2009/0287401 | A1 | 11/2009 | Levine et al. |
| 2010/0030458 | A1 | 2/2010 | Coughlin |
| 2010/0082190 | A1 | 4/2010 | Jinno et al. |
| 2010/0161192 | A1 | 6/2010 | Nara et al. |
| 2010/0171640 | A1 | 7/2010 | Delia et al. |
| 2010/0308986 | A1 | 12/2010 | Dobryden et al. |
| 2011/0043348 | A1 | 2/2011 | Blackard et al. |
| 2011/0126797 | A1 | 6/2011 | Russell |
| 2011/0190972 | A1 | 8/2011 | Timmons et al. |
| 2011/0241862 | A1 | 10/2011 | Debouk et al. |
| 2014/0156182 | A1 | 6/2014 | Nemec et al. |
| 2014/0336913 | A1 | 11/2014 | Fino |
| 2015/0145995 | A1 | 5/2015 | Shahraray et al. |
| 2015/0154860 | A1 | 6/2015 | Holzwanger et al. |
| 2015/0166062 | A1 | 6/2015 | Johnson et al. |
| 2016/0148507 | A1 | 5/2016 | Pittman et al. |
| 2016/0207537 | A1 | 7/2016 | Urano |
| 2016/0358463 | A1 | 12/2016 | Cho et al. |
| 2017/0018189 | A1* | 1/2017 | Ishikawa ............ B62D 15/0255 |
| 2017/0029021 | A1 | 2/2017 | Lee et al. |
| 2017/0124868 | A1 | 5/2017 | Bhat et al. |
| 2017/0154525 | A1 | 6/2017 | Zou et al. |
| 2017/0225686 | A1 | 8/2017 | Takaso et al. |
| 2017/0341647 | A1 | 11/2017 | Rajvanshi et al. |
| 2017/0355368 | A1 | 12/2017 | O'Dea |
| 2018/0075739 | A1 | 3/2018 | Ginsberg et al. |
| 2018/0151064 | A1 | 5/2018 | Xu et al. |
| 2018/0157258 | A1 | 6/2018 | O'Brien et al. |
| 2018/0173228 | A1 | 6/2018 | Wada et al. |
| 2018/0253968 | A1 | 9/2018 | Yalla |
| 2018/0261083 | A1 | 9/2018 | Sun |
| 2018/0354518 | A1 | 12/2018 | Inou et al. |
| 2019/0071099 | A1* | 3/2019 | Nishiguchi ..... B60W 30/18163 |
| 2019/0082377 | A1 | 3/2019 | Silver |
| 2019/0084572 | A1 | 3/2019 | Oishi et al. |
| 2019/0106108 | A1 | 4/2019 | Wienecke et al. |
| 2019/0122178 | A1 | 4/2019 | Kempf |
| 2019/0122548 | A1 | 4/2019 | Sakuma |
| 2019/0180617 | A1 | 6/2019 | Hori et al. |
| 2019/0227546 | A1 | 7/2019 | Sato |
| 2019/0243371 | A1 | 8/2019 | Nister et al. |
| 2019/0272747 | A1 | 9/2019 | Raamot |
| 2019/0300014 | A1 | 10/2019 | Nagase et al. |
| 2019/0322289 | A1 | 10/2019 | Adachi et al. |
| 2019/0344790 | A1 | 11/2019 | Kitagawa |
| 2020/0070827 | A1 | 3/2020 | Choi |
| 2020/0079377 | A1 | 3/2020 | Yashiro et al. |
| 2020/0184238 | A1 | 6/2020 | Kobayashi et al. |
| 2020/0201356 | A1 | 6/2020 | Schuh et al. |
| 2020/0207348 | A1 | 7/2020 | Sato |
| 2020/0255007 | A1 | 8/2020 | Tsuji et al. |
| 2020/0307582 | A1 | 10/2020 | Sato |
| 2020/0307600 | A1 | 10/2020 | Sato |
| 2021/0061275 | A1 | 3/2021 | Takahama |
| 2021/0370914 | A1 | 12/2021 | Li et al. |

FOREIGN PATENT DOCUMENTS

| | | |
|---|---|---|
| JP | 2009-149255 | 7/2009 |
| JP | 2012-096569 | 5/2012 |
| JP | 2013-232079 | 11/2013 |
| JP | 2015-022423 | 2/2015 |
| JP | 2016-004443 | 1/2016 |
| JP | 2016-088383 | 5/2016 |
| JP | 2016-097827 | 5/2016 |
| JP | 2018-030479 | 3/2018 |
| JP | 2018-151287 | 9/2018 |
| JP | 2018-158684 | 10/2018 |
| JP | 2018-180594 | 11/2018 |
| JP | 2019-051894 | 4/2019 |
| JP | 2019-127136 | 8/2019 |
| WO | WO 2009/086857 | 7/2009 |

OTHER PUBLICATIONS

Office Action dated Aug. 4, 2021 issued in U.S. Appl. No. 16/809,291.
Notice of Allowance dated Sep. 22, 2021 issued in U.S. Appl. No. 16/829,824.
Office Action dated Sep. 29, 2021 issued in U.S. Appl. No. 16/783,990.
Office Action dated Nov. 24, 2021 issued in U.S. Appl. No. 16/809,291.
Office Action dated Dec. 21, 2021 issued in U.S. Appl. No. 16/783,912.
Notice of Allowance dated Dec. 17, 2021 issued in U.S. Appl. No. 16/783,990.
Office Action dated Oct. 4, 2021 issued in French Patent Application No. 2008539.
Office Action dated Oct. 7, 2021 issued in related U.S. Appl. No. 16/597,540.
Notice of Allowance dated Aug. 10, 2021 issued in U.S. Appl. No. 16/791,729.
Notice of Allowance dated May 5, 2022 issued in U.S. Appl. No. 16/828,663.

* cited by examiner

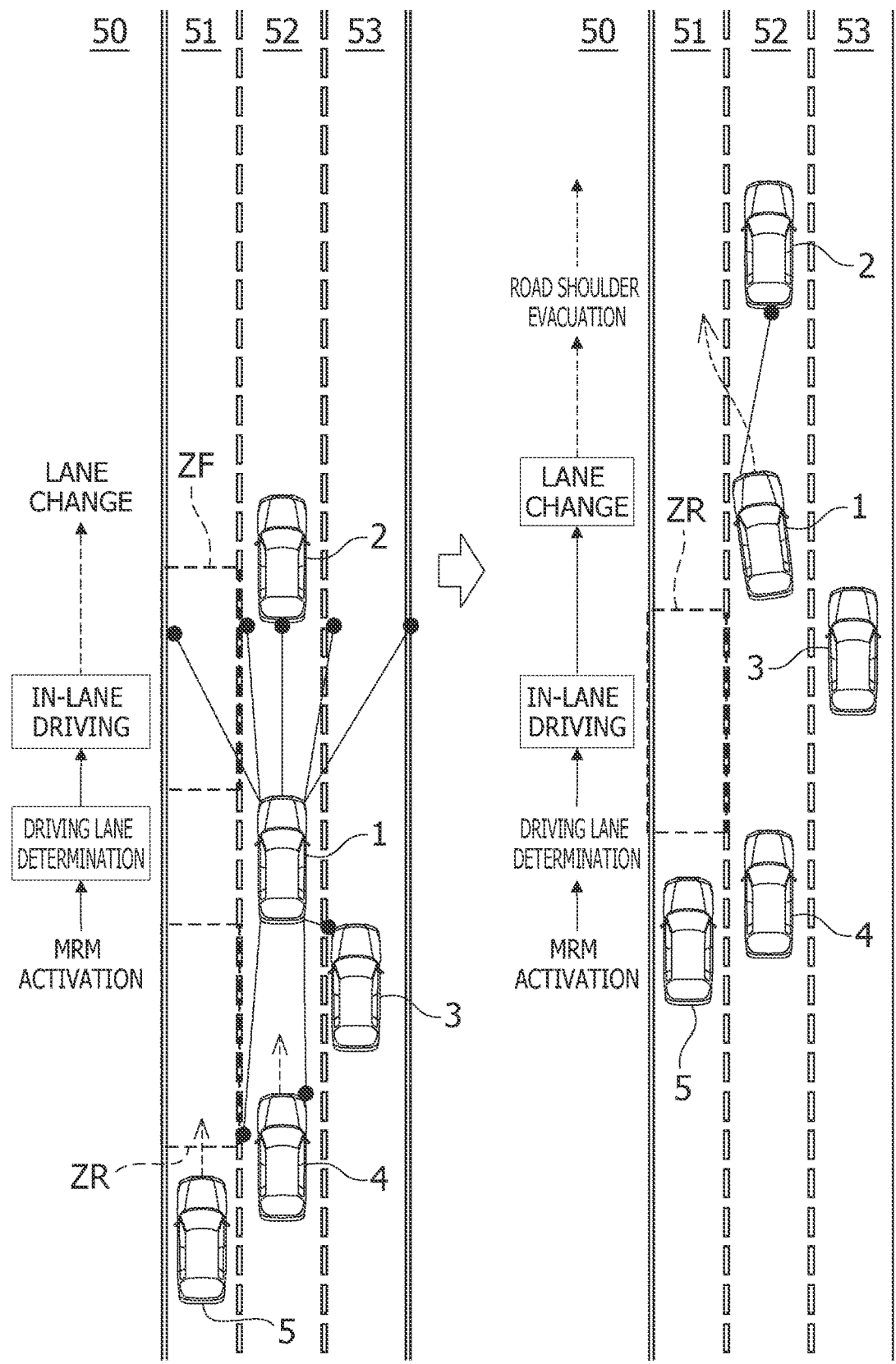

FIG.8A
FIG.8B
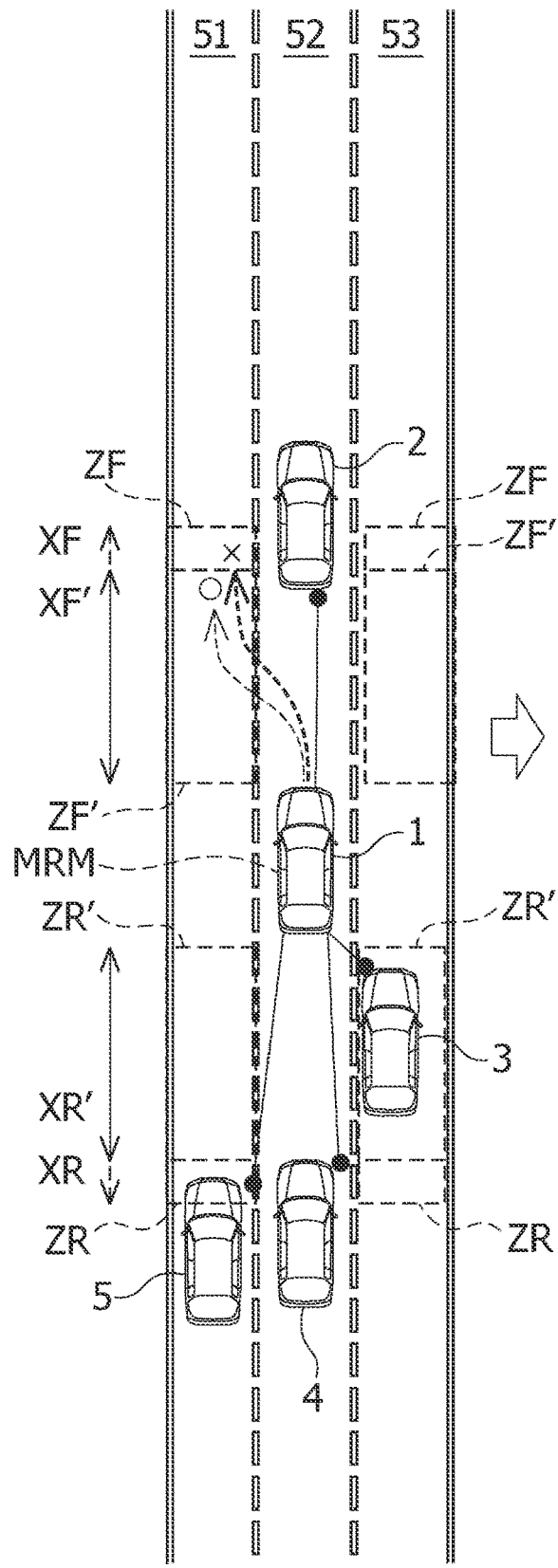
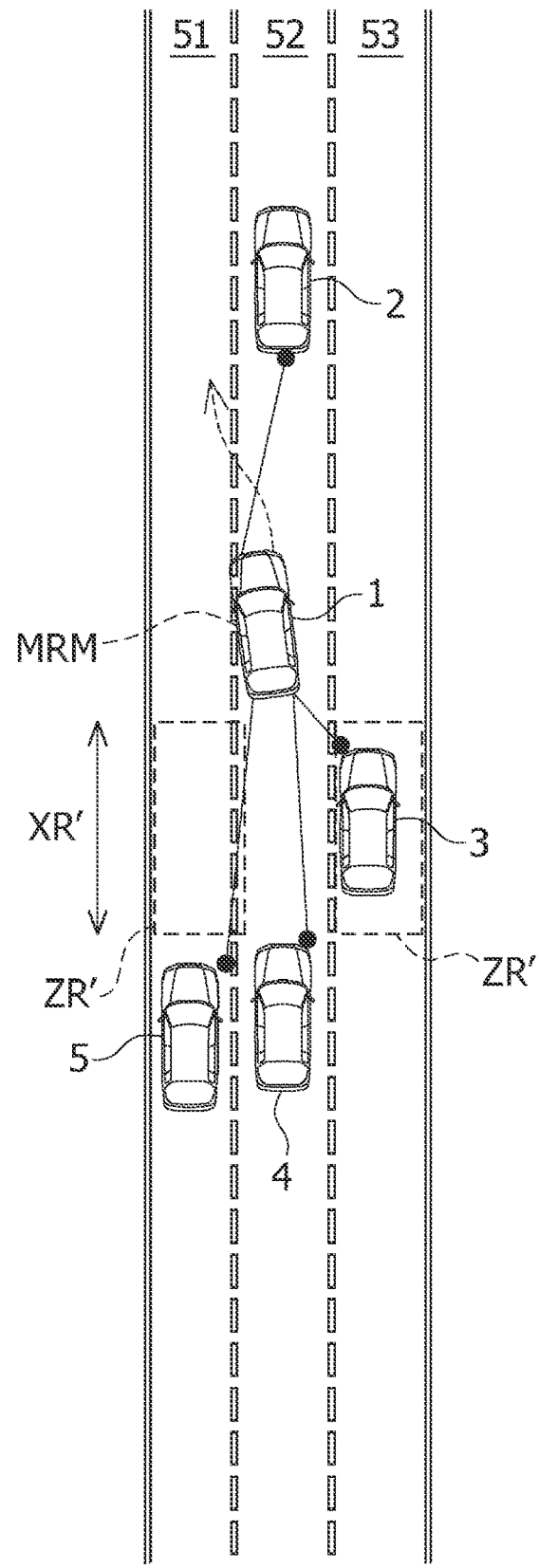

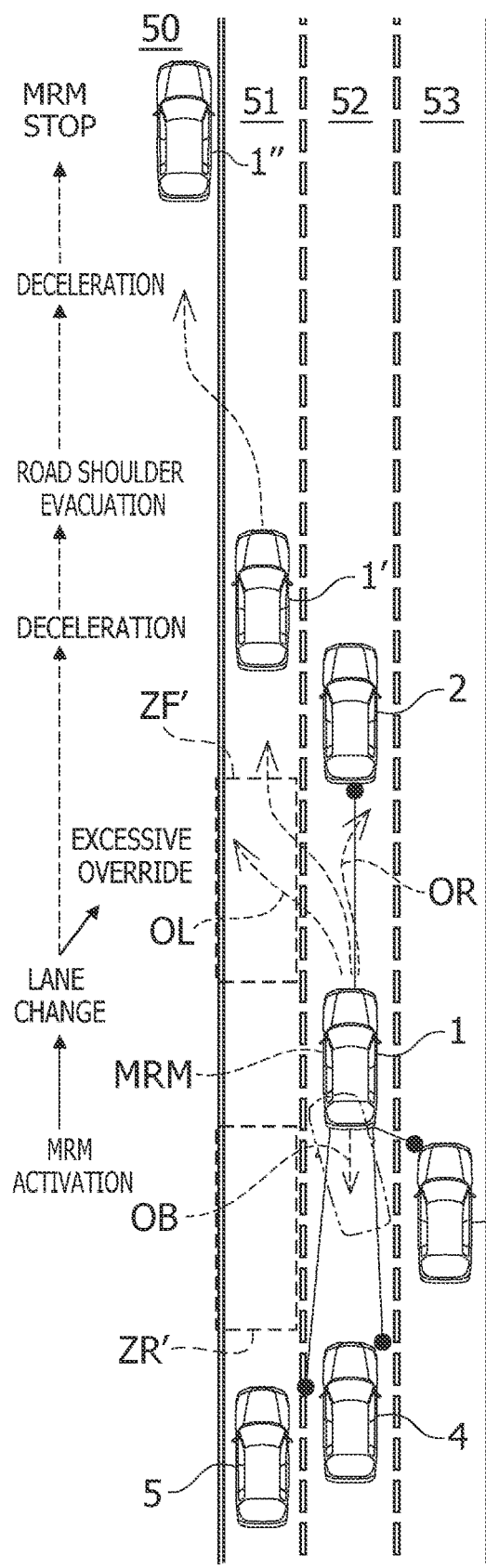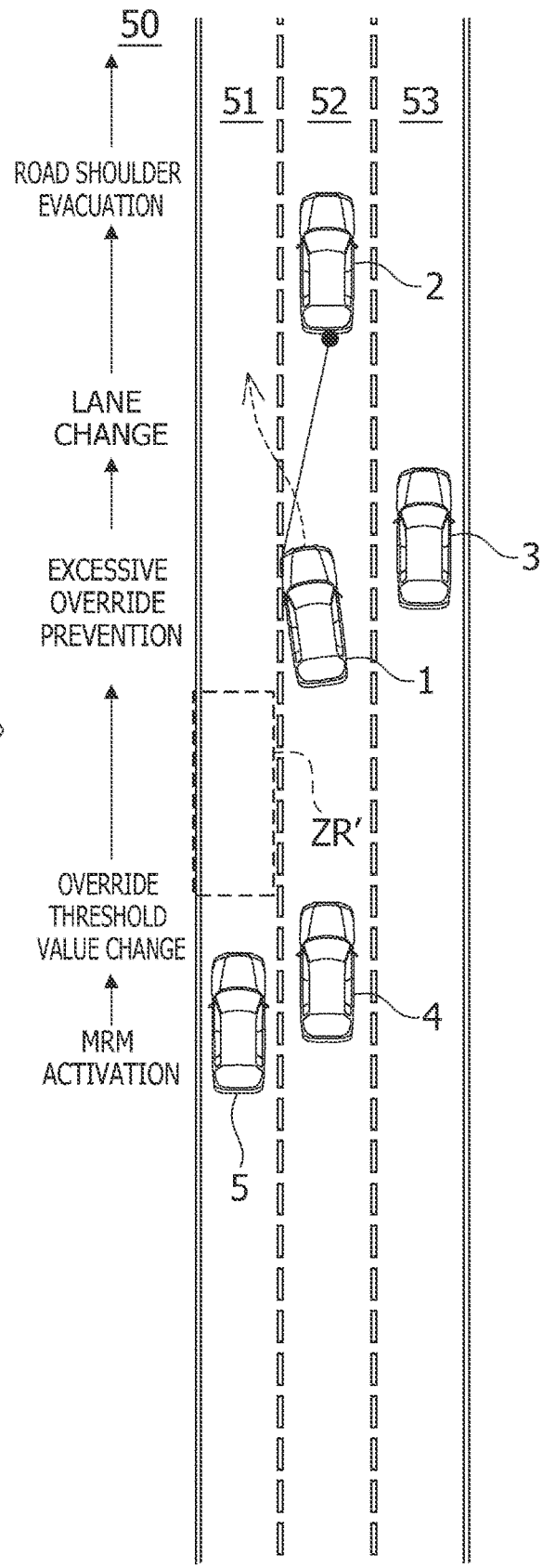

DRIVING CONTROL APPARATUS FOR VEHICLE

FIELD OF THE INVENTION

The present invention relates to driving control apparatuses for vehicles, and more particularly, relates to an emergency evacuation (bringing the vehicle to a road shoulder), a minimal risk maneuver, when a driver cannot take over operation when failure occurs in partially automated in-lane driving systems or partially automated lane change systems.

DISCUSSION OF THE RELATED ART

A variety of techniques for reducing burdens on drivers and for safe-driving support, for example, adaptive cruise control systems (ACCS) and lane keeping assistance systems (LKAS), have been put into practical use. Furthermore, the practical application and international standardization of a "partially automated in-lane driving system (PADS)" and a "partially automated lane change system (PALS)" based on these techniques are being promoted.

If a system failure occurs or if driving conditions of a vehicle deviate from system limits, such a driving control system notifies a driver of an operation takeover request and shifts to manual operation by the driver, but if the operation is not taken over by the driver due to the driver dozing off, being distracted, being ill, or the like, it shifts to a minimal risk maneuver (MRM) such as emergency evacuation.

For example, JP 2018-180594 discloses, at a time of driving change to unplanned manual driving due to failure, deterioration, or the like of a peripheral monitoring sensor used for automated driving, switching the mode of driving change in accordance with the driver's state detected by a driver status monitor and immediately stopping without the operation takeover request.

However, if the operation shifts to immediate stop, automated evacuation, or the like without notifying the operation takeover request, vehicle behavior may become unstable or the vehicle may suddenly come closer to a following vehicle due to excessive override by the driver who is awakened and agitated by sudden decrease in vehicle speed or vehicle behavior for automated evacuation.

SUMMARY OF THE INVENTION

The present invention has been made in view of the above-described actual situation, and an object is to make it possible to smoothly and promptly execute emergency evacuation in the case in which a driver cannot take over operation when a failure occurs in a partially automated in-lane driving system or a partially automated lane change system.

In order to solve the above-described problems, the present invention is a driving control apparatus for a vehicle, including:

an environmental condition estimating part including a surrounding recognition function for recognizing a vehicle's driving lane, neighboring lanes, and other vehicles driving in the driving lanes and a function for obtaining the vehicle's moving state;

a path generating part for generating a target path on the basis of information obtained by the environmental condition estimating part; and a vehicle control part configured to perform speed control and steering control for making the vehicle follow the target path, the driving control apparatus for a vehicle being characterized by having:

a function for performing automated in-lane driving by maintaining a set vehicle speed when there is no preceding other vehicle in the vehicle driving lane, and maintaining a set inter-vehicle distance when there is a preceding other vehicle;

a function for performing automated lane change to a neighboring lane when there is no other vehicle in a predetermined area of the neighboring lane;

a function for notifying a driver of stopping the functions and an operation takeover request when a system failure occurs during operation of the functions; and a function for evacuating the vehicle to a road shoulder when the driver cannot take over operation at the notification, wherein the driving control apparatus is configured to, in the case in which the vehicle is not in a first lane neighboring the road shoulder at operation of the function for evacuating, perform the lane change from in-lane driving maintaining the set inter-vehicle distance or the set vehicle speed to the first lane, and prior thereto, the predetermined area serving as a criterion of the lane change to the first lane is changed to a second predetermined area smaller than the predetermined area of the automated lane change.

As described above, according to the driving control apparatus for the vehicle according to the present invention, because when the vehicle is not in the first lane adjacent to the road shoulder at the time of the evacuation function operation, lane change from in-lane driving maintaining (vehicle speed maintaining) the set inter-vehicle distance or the set vehicle speed in the first lane is performed, sudden proximity to a following vehicle due to a sudden decrease in vehicle speed is prevented, and because of the maintained vehicle speed, prompt lane change in accordance with traffic flow becomes possible compared with immediate deceleration.

In addition, since prior to the lane change to the first lane, the predetermined area serving as a criterion for lane change is changed to the second predetermined area smaller than at a normal time, opportunities for the lane change to the first lane are increased and shift to the lane change becomes easy, time to drive in a second or third lane is shortened, and as a result, prompt deceleration and stopping is expected.

In addition, a sudden decrease in vehicle speed is prevented, and unstable behavior of the vehicle or sudden approach to a following vehicle due to excessive override of the driver agitated by the sudden decrease in vehicle speed is prevented.

BRIEF DESCRIPTION OF DRAWINGS

FIG. 7A is a schematic plan view exemplifying a driving lane determination in the emergency evacuation control, and FIG. 7B is a schematic plan view exemplifying lane change from in-lane driving to a first lane.

FIG. 8A is a schematic plan view exemplifying a lane change criterion change in the emergency evacuation control, and FIG. 8B is a schematic plan view exemplifying automated lane change to the first lane after the lane change criterion change.

FIG. 9A is a schematic plan view exemplifying the automated lane change to the first lane to road shoulder evacuation, and FIG. 9B is a schematic plan view exemplifying excessive override prevention control during the automated lane change to the first lane.

DETAILED DESCRIPTION OF THE DRAWINGS

Hereinafter, an embodiment of the present invention will be described in detail with reference to the drawings.

Figure 1:
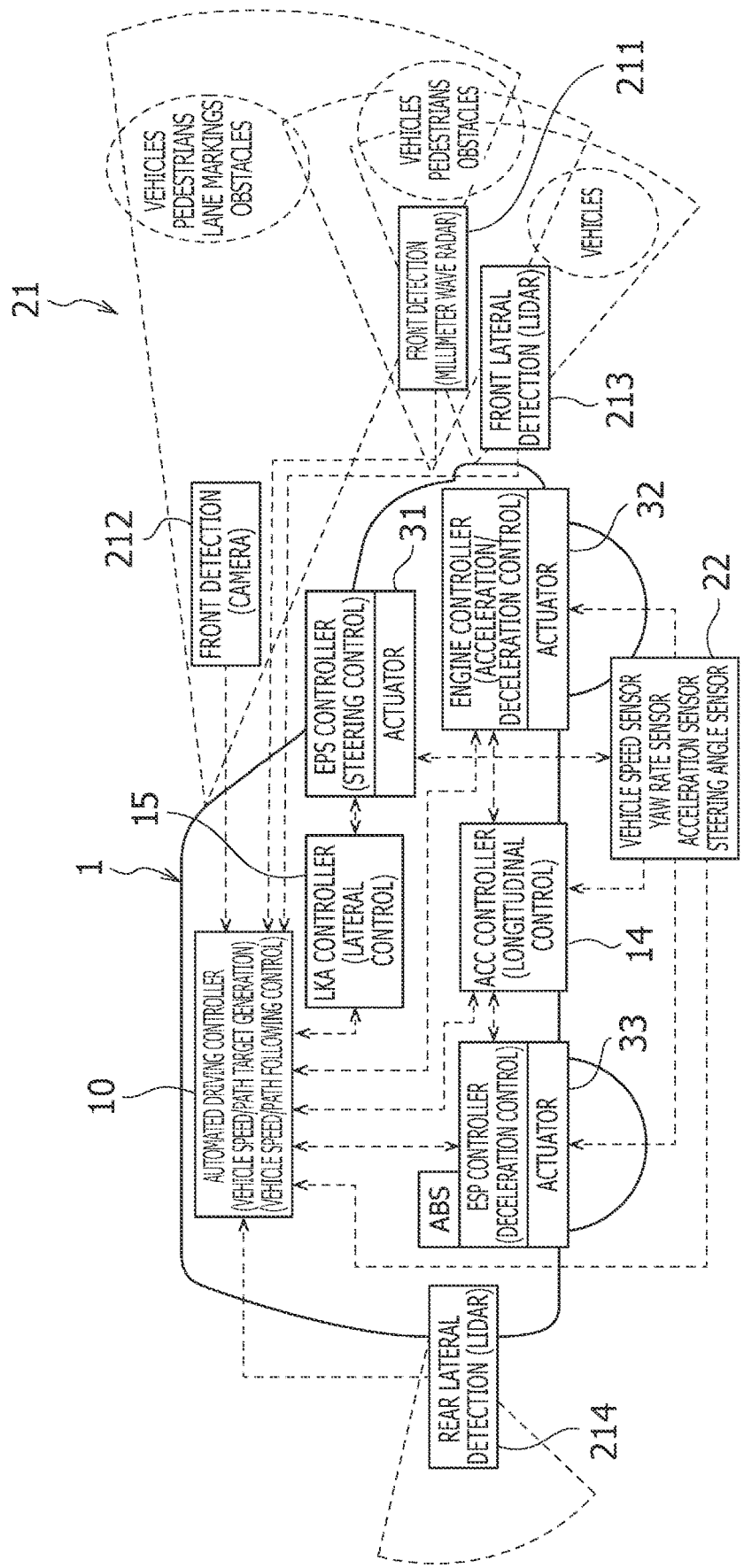
FIG. 1 is a schematic view showing a driving control system of a vehicle.

In FIG. 1, a vehicle 1 equipped with a driving control system according to the present invention includes, in addition to common components, such as an engine and a vehicle body, of an automobile, an external sensor 21 for detecting a vehicle surrounding environment, an internal sensor 22 for detecting vehicle information, a controller/actuator group for speed control and steering control, an ACC controller 14 for inter-vehicle distance control, an LKA controller 15 for lane keeping support control, and an automated driving controller 10 for controlling them and executing partially automated in-lane driving (PADS) and automated lane change (PALS) in order to perform, at the vehicle side, recognition, determination, and operation conventionally performed by a driver.

The controller/actuator group for speed control and steering control includes an EPS (Electric Power Steering) controller 31 for steering control, an engine controller 32 for acceleration/deceleration control, and an ESP/ABS controller 33. An ESP (registered trademark; Electronic Stability Program) includes an ABS (Antilock Brake System) to form a stability control system (vehicle behavior stabilization control system).

The external sensor 21 is composed of a plurality of detection means for inputting lane markings on a road defining the vehicle's own driving lane and the neighboring lane, and presence of and relative distance from other vehicles, obstacles, people, and the like around the vehicle into the automated driving controller 10 as image data or point cloud data.

Figure 2:
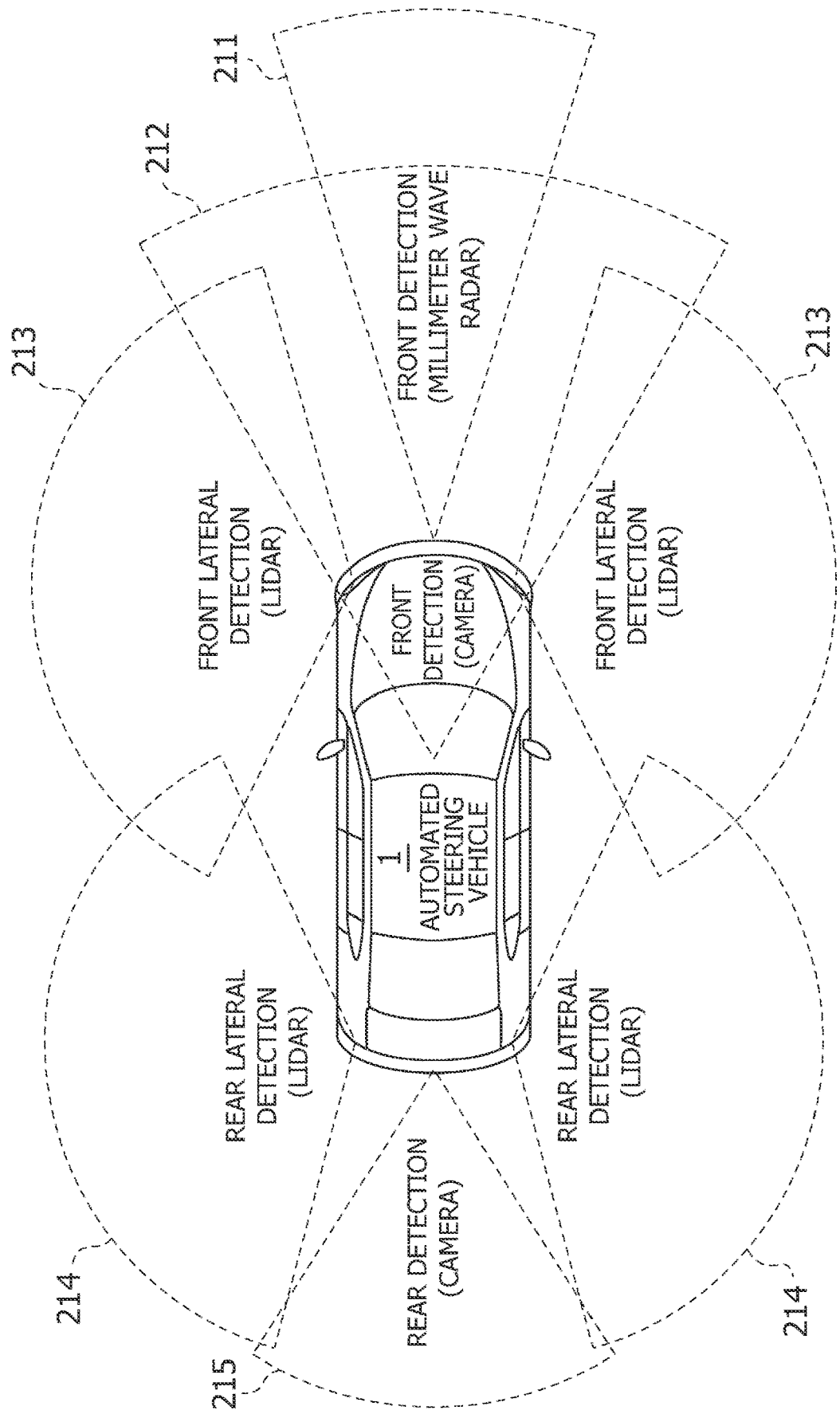
FIG. 2 is a schematic plan view showing an external sensor group of the vehicle.

For example, as shown in FIG. 2, the vehicle 1 includes a millimeter wave radar (211) and a camera (212) as forward detection means 211 and 212, LIDARs (Laser Imaging Detection And Ranging) as front lateral direction detection means 213 and rear lateral direction detection means 214, and a camera (back camera) as rearward detection means 215, covers 360 degrees around the vehicle, and can detect positions of and distance from vehicles, obstacles and the like, and lane marking positions of the vehicle's driving lane and neighboring lanes within a predetermined range in the front, rear, left, and right directions of the vehicle.

Figure 3:
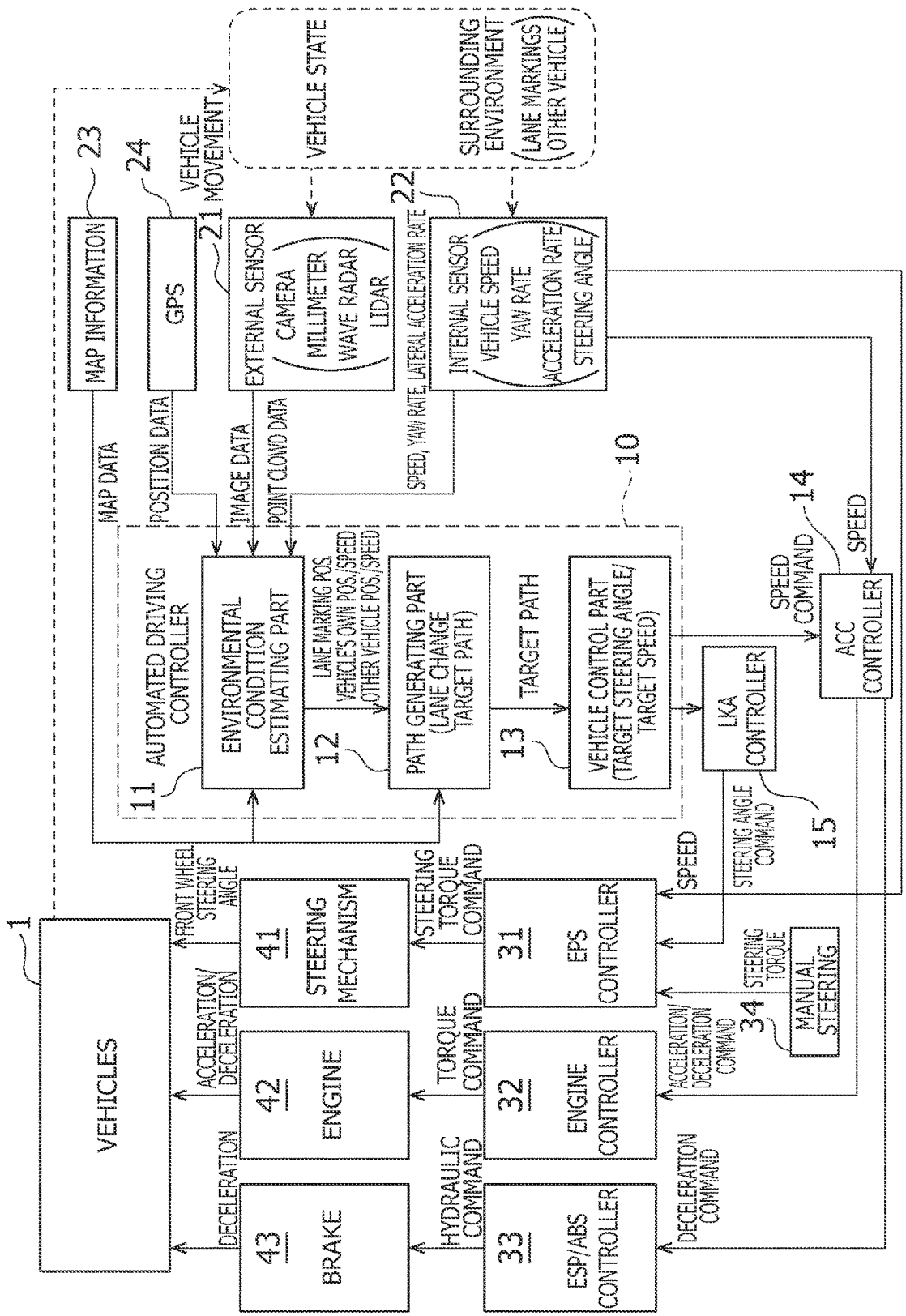
FIG. 3 is a block diagram showing the driving control system of the vehicle.

The internal sensor 22 is composed of a plurality of detection means, such as a vehicle speed sensor, a yaw rate sensor and an acceleration sensor, for measuring physical quantities representing the movement state of the vehicle, and their measurement values are input into the automated driving controller 10, ACC controller 14, LKA controller 15, and EPS controller 31 as shown in FIG. 3, and undergo arithmetic processing together with an input from the external sensor 21.

The automated driving controller 10 includes an environmental condition estimating part 11, a path generating part 12 and a vehicle control part 13, and includes a computer for performing functions as described below, that is, a ROM storing programs and data, a CPU for performing arithmetic processing, a RAM for reading out the programs and data, and storing dynamic data and arithmetic processing results, an input/output interface, and the like.

The environmental condition estimating part 11 acquires the absolute position of the vehicle itself by matching the vehicle's own position information by positioning means 24 such as a GPS and map information 23, and on the basis of external data such as the image data and point cloud data obtained by the external sensor 21, estimates positions of lane markings of the vehicle's own driving lane and the neighboring lane, and positions and speeds of other vehicles. In addition, it acquires the movement state of the vehicle itself from internal data measured by the internal sensor 22.

The path generating part 12 generates a target path from the vehicle's own position estimated by the environmental condition estimating part 11 to an arrival target. It generates a target path from the vehicle's own position to an arrival target point in lane change on the basis of the positions of the lane markings of the neighboring lane, the positions and speeds of the other vehicles, and the movement state of the vehicle itself estimated by the environmental condition estimating part 11.

The vehicle control part 13 calculates a target speed and a target steering angle on the basis of the target path generated by the path generating part 12, transmits a speed command for constant speed cruise or inter-vehicle distance keeping and following cruise to the ACC controller 14, and transmits a steering angle command for path following to the EPS controller 31 via the LKA controller 15.

The vehicle speed is also input into the EPS controller 31 and ACC controller 14. Because a steering torque changes according to the vehicle speed, the EPS controller 31 refers to a steering angle-steering torque map for each vehicle speed and transmits a torque command to a steering mechanism 41. The engine controller 32, ESP/ABS controller 33, and EPS controller 31 control an engine 42, a brake 43, and the steering mechanism 41, and thereby control movement of the vehicle 1 in a longitudinal direction and a lateral direction.

Next, partially automated in-lane driving (PADS driving) by a partially automated in-lane driving system (PADS) is enabled in a state in which both ACC controller 14 included in the ACCS and LKA controller 15 included in the LKAS are operating together with the automated driving controller 10.

At the same time as operation of the partially automated in-lane driving system, the automated driving controller 10 (path generating part 12) generates a target path within a single lane and a target speed on the basis of the external information (lanes, vehicle position, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated driving controller 10 (vehicle control part 13) estimates the speed, attitude, and lateral displacement of the vehicle after Δt seconds from a relationship between a yaw rate γ and lateral acceleration $(d^2y/dt^2)$ occurring due to vehicle movement by the vehicle's own position and movement characteristics of the vehicle itself, that is, a front wheel steering angle δ occurring when a steering torque T is applied to the steering mechanism 41 during traveling at a vehicle speed V, gives a steering angle command that makes the lateral displacement to "yt" after Δt seconds to the EPS controller 31 via the LKA controller 15, and gives a speed command that makes the speed "Vt" after Δt seconds to the ACC controller 14.

Although the ACC controller 14, LKA controller 15, EPS controller 31, engine controller 32, and ESP/ABS controller 33 operate independently of automatic steering, they are also operable according to command input from the automated driving controller 10 while a partially automated in-lane driving function (PADS) and a partially automated lane change system (PALS) are operating.

The ESP/ABS controller 33 that has received a deceleration command from the ACC controller 14 issues a hydraulic command to an actuator and controls braking force of the brake 43 to control the vehicle speed. In addition, an engine controller 32 that has received an acceleration/deceleration command from the ACC controller 14 controls an actuator output (degree of throttle opening) to give the engine 42 a torque command and controls driving force to control the vehicle speed.

The ACC function (ACCS) functions with combination of hardware and software, such as the millimeter wave radar as the forward detection means 211 included in the external sensor 21, ACC controller 14, engine controller 32, and ESP/ABS controller 33 and the like.

That is, in a case in which there is no vehicle ahead, the ACC function performs constant speed cruise by setting ACC set speed (set speed) as the target speed; and in a case of having caught up with the vehicle ahead (in a case in which a speed of the vehicle ahead is slower than ACC set speed), the ACC function performs following cruise following the vehicle ahead while maintaining an inter-vehicle distance (set inter-vehicle distance) corresponding to a time gap (inter-vehicle time=inter-vehicle distance/speed of vehicle) set in accordance with the speed of the vehicle ahead.

The LKA function (LKAS) detects the lane markings and the vehicle's own position by the environmental condition estimating part 11 of the automated driving controller 10 on the basis of image data obtained by the external sensor 21 (cameras 212 and 215), and performs steering control by the EPS controller 31 via the LKA controller 15 so as to be able to drive at a lane center.

That is, the EPS controller 31 that has received the steering angle command from the LKA controller 15 refers to a vehicle speed-steering angle-steering torque map, issues a torque command to an actuator (EPS motor), and gives a front wheel steering angle targeted by the steering mechanism 41.

The partially automated in-lane driving function (PADS) is implemented by combining longitudinal control (speed control and inter-vehicle distance control) by the ACC controller 14 and lateral control (steering control and lane keeping driving control) by the LKA controller 15 as described above.

Next, an outline of the partially automated lane change system (PALS) will be explained on the assumption of lane change from a state of partially automated in-lane driving (PADS driving) on a highway with two or more lanes on one side with a median.

The partially automated lane change system (PALS) is a system that automatically performs lane change by determination of the system itself or the driver's instructions or approval, and is implemented by combining longitudinal control (speed control and inter-vehicle distance control) and lateral control (target path following control by automatic steering) by the automated driving controller 10.

At the same time as operation of the partially automated lane change system, the automated driving controller 10 (path generating part 12) constantly generates a target path for changing lanes from a currently driving lane to a neighboring lane on the basis of the external information (lane markings of the lane and neighboring lane, and positions and speeds of other vehicles driving in the lane and neighboring lane) obtained by the environmental condition estimating part 11 through the external sensor 21, and the internal information (vehicle speed, yaw rate, and acceleration) obtained by the internal sensor 22.

The automated lane change target path is a path that leads to a state of driving at the center of the neighboring lane by performing lane change from the currently driving lane, regarding other vehicles driving in the neighboring lane, their future positions and speeds are predicted, and automated lane change is executed by automatic steering by determination of the system in which it is determined that there is no other vehicle in a front predetermined area ZF, a rear predetermined area ZR, and a lateral predetermined area ZL of the neighboring lane set according to speed of the vehicle.

The front predetermined area ZF and rear predetermined area ZR correspond to inter-vehicle distance that should be secured from another vehicle in front of and at the back of the vehicle, that is, front predetermined distance XF and rear predetermined distance XR, and they are calculated by the following expressions, respectively.

Front predetermined distance($XF$)=inter-vehicle distance($S$)+vehicle head time($TH$)×speed of the vehicle($V$), where inter-vehicle distance($S$)=speed of the vehicle ($V$)×inter-vehicle time($TG$);

vehicle head time($TH$)=vehicle head distance/$V=TTC \times \Delta V/V$;

$TTC=\Delta V$/maximum deceleration of the vehicle($D_{max}$); and $\Delta V=V-Vf$, where $Vf$ denotes speed of the vehicle ahead.

Rear predetermined distance($XR$)=vehicle head time ($TH$)×speed of vehicle behind($Vr$), where, vehicle head time($TH$)=vehicle head distance/$V=TTC \times \Delta V/V$;

$TTC=\Delta V$/deceleration of vehicle behind($Dr$); and $\Delta V=Vr-V$, where $Vr$ denotes speed of the vehicle behind.

As is clear from the above, since the front predetermined distance (XF) and rear predetermined distance (XR) vary depending on the speeds V, Vf, and Vr of the vehicle, vehicle ahead, and vehicle behind, respectively, a lookup table storing calculated values for each of the speed of the vehicle (V) and relative speed (ΔV) for each is prepared, and corresponding values are applied by a reference process.

The front predetermined area ZF is an area defined by the longitudinal direction: the front predetermined distance XF×the lateral direction: width of the driving lane+width of the neighboring lane, and the rear predetermined area ZR is an area defined by the longitudinal direction: the rear predetermined distance XR×the lateral direction: width of the driving lane+width of the neighboring lane. In addition, the lateral predetermined area ZL is an area defined by the longitudinal direction: vehicle length×the lateral direction: width of the neighboring lane.

As described above, in the state in which the vehicle surrounding environment and target path are confirmed and an automated lane change possible flag is set, automated lane change is executed by the determination of the system (or the driver's approval), but there is also a possibility that the surrounding environment may change due to behavior of another vehicle during a period from starting lane change after blinking a blinker to moving to the neighboring lane.

Therefore, also during automated lane change, monitoring of the periphery of the vehicle is continued by external information obtained by the environmental condition estimating part 11 through the external sensor 21, and if intrusion (interruption) of another vehicle into the front predetermined area ZF, rear predetermined area ZR, or lateral predetermined area ZL is confirmed, the automated driving controller 10 determines whether lane change should be continued or cancelled on the basis of the vehicle's own position during lane change.

If it is determined that lane change cannot be continued and lane change is cancelled, the automated driving controller 10 (path generating part 12) changes the following target to the center line of the lane (original lane) in which the vehicle was driving before lane change to regenerate a target path and vehicle speed, and the vehicle control part 13 gives a steering angle command to the EPS controller 31 and a speed command to the ACC controller 14 for making the vehicle to follow the regenerated target path, and thereby the vehicle returns to the original lane by automatic steering (automated lane return function).

Even if intrusion (interruption) of another vehicle into the front predetermined area ZF, rear predetermined area ZR, or lateral predetermined area ZL is confirmed, when the vehicle has almost moved to the neighboring lane, for example, when three or more of the four wheels have entered the neighboring lane, crossing the lane marking, lane change is not cancelled and lane change continues.

On the other hand, if it is determined that continuation of lane change is difficult, an operation takeover request is notified, automated lane change is cancelled, and authority is transferred to the driver. When the driver takes over, the operation shifts to manual driving, but when the driver cannot take over, the minimal risk maneuver (MRM) is activated.

The minimal risk maneuver (MRM) indicates automatically shifting to a minimal risk condition when failure or the like occurs in a system, and specifically, control for evacuation to a road shoulder or the like and deceleration and stop by automatic steering and braking is performed. Note that even when the MRM is in operation, if the driver performs brake operation or steering operation, the MRM is overridden and shifted to manual driving.

In the partially automated lane change system (PALS), if some kind of system failure, such as abnormality of a part of the sensors included in the system, occurs, there is a possibility that automated lane change as designed cannot be performed, and therefore also in such a case, the driver is notified of an operation takeover request (takeover request) and authority is transferred, but when the driver cannot take over, the minimal risk maneuver (MRM) is activated.

As described-above, the external sensor 21 is composed of the plurality of sensors, and the automated driving controller 10 is redundantly designed to be able to perform the minimal risk maneuver (MRM) by other sensors and detection means even if abnormality occurs in any sensor or detection means.

Figure 6:
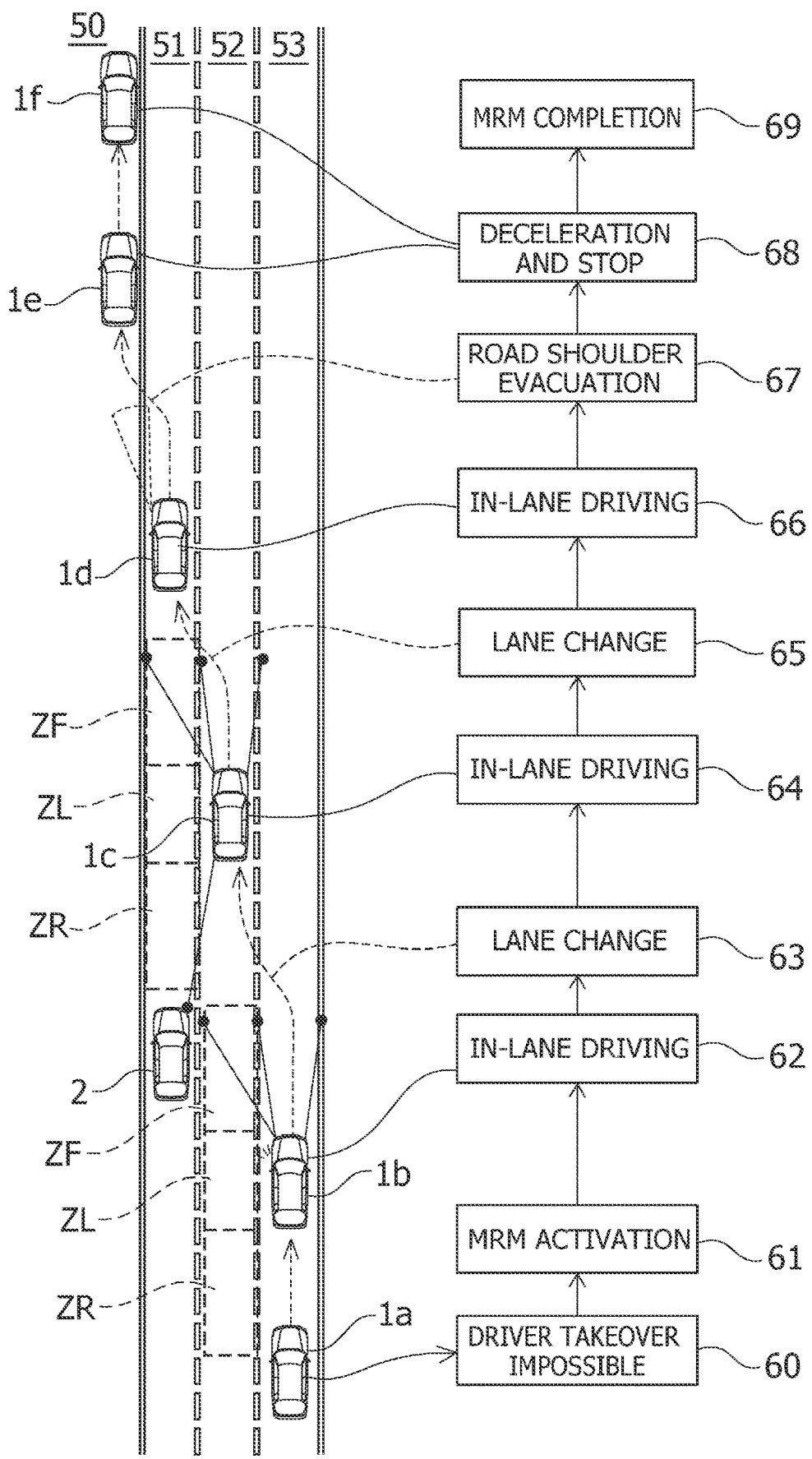
FIG. 6 is a schematic plan view showing an outline of emergency evacuation control.

FIG. 6 shows movements (1a-1f) of a vehicle 1 when the MRM is activated in the vehicle 1 driving in a third lane 53 on a three-lane highway on one side. Basically, the MRM is composed of four functions of in-lane driving (62, 64, and 66), lane change (63 and 65), road shoulder evacuation (67), and deceleration and stop (68), and when road shoulder evacuation is performed by the MRM during driving in a lane other than the first lane 51 on a two-or-more-lane road on one side, the vehicle requires control that needs at least one lane change to a neighboring lane from in-lane driving, road shoulder evacuation (movement to a road edge), and deceleration and stop.

Therefore, as shown in FIG. 6, in the vehicle 1 (1a) driving in the third lane 53, when the driver cannot take over (60) and the MRM is activated (61), there needs control of undergoing two lane changes (63 and 65) and in-lane driving (64 and 66), evacuating to the road shoulder (67), and decelerating and stopping (68). However, as already described, there is a problem as follows.

For example, in a situation shown in FIG. 7A, when the MRM is activated in the vehicle 1 driving in the second lane 52, first, a driving lane determination is made, and a transition to lane change from in-lane driving to the first lane 51 is made, but when there is a following vehicle 4, if the vehicle 1 immediately shifts to deceleration control (for example, from a set speed of 80 km/h to 50 km/h) during in-lane driving, the following vehicle 4 may approach rapidly.

Lane change by the MRM can be performed when no other vehicle is in the front predetermined area ZF and the rear predetermined area ZR, and, for example, if there is a following vehicle 5 in the neighboring first lane 51, the following vehicle 5 may approach and enter the rear predetermined area ZR, so the lane change to the first lane 51 cannot be performed, lane change along the traffic flow cannot be performed, and time required to complete the MRM may become longer.

As described above, even if the MRM is in operation, when the driver performs brake operation or steering operation, the MRM is overridden and the operation shifts to manual driving, but if the driver who was not able to take over due to dozing off, distraction, illness, or the like is awakened by the vehicle behavior or the like caused by deceleration control and lane change after the MRM activation and is agitated by the situation of the vehicle, performs excessive brake operation (OB), and overrides the MRM as shown in FIG. 9A, there is a risk of causing a problem such as the following vehicles 4 and 5 approach rapidly due to sudden deceleration of a vehicle 1'.

In the same manner as above, if the driver who was not able to take over is awakened by the vehicle behavior or the like caused by deceleration control and lane change after the MRM activation and agitated by the situation of the vehicle, performs excessive left steering (OL) or right steering (OR), and overrides the MRM as shown in FIG. 9A, there is a risk of causing a problem such as lane deviation or sudden approach to the following vehicles 4 and 5.

The automated driving controller 10 according to the present invention executes the minimum risk maneuver (MRM) including the following control.

(1) Speed Control (Longitudinal Control)

When the vehicle is driving in a lane other than the first lane, ACC driving continues until the vehicle moves to the first lane after the MRM is activated. That is, when there is a preceding vehicle, the vehicle follows the preceding vehicle while maintaining the set inter-vehicle distance (inter-vehicle time), whereas when there is no preceding vehicle, the vehicle performs lane change to move to the first lane 51 while maintaining and driving at the set speed (ACC set speed), then changes the set speed (ACC set speed) to a low speed, for example, the minimum speed (50 km/h) of the highway, decelerates to that speed, evacuates to the road shoulder 50, and then decelerates and stops.

(2) Front and Rear Predetermined Distance Change Serving as Lane Change Criterion The predetermined areas serving as the lane change criterion are changed to predetermined areas (front predetermined distance XF' and rear predetermined distance XR') at the MRM activation smaller than the predetermined areas (front predetermined distance XF and rear predetermined distance XR) at the normal time, and a lane change possible condition is relaxed.

The predetermined areas (front predetermined distance XF' and rear predetermined distance XR') applied to the lane change determination at the MRM activation are set, for example, as follows with respect to the aforementioned predetermined areas (front predetermined distance XF and rear predetermined distance XR) at the normal time.

Front predetermined distance($XF'$)=minimum inter-vehicle distance($S_0$)+vehicle head time($TH$)×speed of the vehicle($V$), where, minimum inter-vehicle distance($S_0$)=speed of the vehicle($V$)×inter-vehicle time($TG'$); and inter-vehicle time($TG'$)=minimum inter-vehicle time ($TG_{min}$) or $TG > TG' > TG_{min}$.

Rear predetermined distance($XR'$)=vehicle head time ($TH'$)×speed of vehicle behind($Vr$), where, vehicle head time($TH'$)=vehicle head distance/$V = TTC' \times \Delta V/V$;

$TTC' = \Delta V$/vehicle behind maximum deceleration ($Dr_{max}$), or $TTC' = \Delta V$/vehicle behind deceleration($Dr'$), $Dr < Dr' < Dr_{max}$.

That is, the predetermined areas (front predetermined distance XF' and rear predetermined distance XR') at the MRM activation are selected from values that are smaller than the predetermined areas (front predetermined distance XF and rear predetermined distance XR) at the normal time and equal to or larger than minimum predetermined areas (minimum front predetermined distance and minimum rear predetermined distance), respectively.

Since the front predetermined distance XF' and rear predetermined distance XR' that define the predetermined areas at the MRM activation also vary depending on the vehicle speeds V, Vf, and Vr of the vehicle, vehicle ahead, and vehicle behind, respectively, a lookup table for the specific section storing calculated values for each of the speed of the vehicle (V) and relative speed (ΔV) for each is prepared, and corresponding values are applied by a reference process.

(3) Brake Override Threshold Value Change

A brake override threshold value (driver operation amount) is changed to a value greater than the normal time.

That is, a brake override threshold value Pd at a normal time is given by an ESP hydraulic command value (driver operation amount) which is deceleration with respect to the ACC set speed (ACC set speed or preceding vehicle following speed) or the ACC set acceleration, whereas a brake override threshold value Pe at the MRM activation is changed to a value (for example, 120% to 250% of the brake override threshold value Pd at the normal time) greater than the brake override threshold value Pd at a normal time.

For example, if the brake override threshold value Pd at the normal time is set to an ESP hydraulic command value which is deceleration equivalent to a speed of 2 km/h with respect to the ACC set speed or an ESP hydraulic command value which is deceleration equivalent to 0.2 m/s$^2$ with respect to the ACC set acceleration, the brake override threshold value Pe at the MRM activation is set to an ESP hydraulic command value which is deceleration equivalent to a speed of 4 km/h with respect to the ACC set speed or an ESP hydraulic command value which is deceleration equivalent to 0.4 m/s$^2$ with respect to the ACC set acceleration.

If the driver's brake operation is detected at the MRM activation, a brake operation amount by the driver is compared with the override threshold value Pe, if the override amount<the threshold value Pe, the MRM is not overridden, whereas if the override amount≥the threshold value Pe, the operation is shifted to manual driving, and braking is performed by the driver's brake operation.

(4) Steering Override Threshold Value Change

A steering override threshold value (driver steering torque) is changed to a value greater than the normal time. That is, for the steering override threshold value at a normal time, a steering torque (steering torque calculated from a vehicle speed-steering angle-steering torque map) corresponding to a steering angle at which a virtual lateral displacement y't for reaching a virtual lateral position after t seconds becomes yt+α (where α is a constant determined based on the vehicle speed) is set as a steering override threshold value OTd, whereas for the steering override threshold value at the MRM activation, a value obtained by converting a steering angle calculated from a virtual lateral displacement y"t (=yt+β, where β>α) and motion characteristics of the vehicle into a steering torque is set as a steering override threshold value OTe.

When manual steering is detected at the MRM activation, a steering torque by the driver's manual steering is compared with the override steering threshold value OTe, and if the steering torque<the threshold value OTe, the MRM is not overridden, whereas if the steering torque≥the threshold value, the MRM is overridden, and the vehicle is steered by the driver's steering torque. Note that during lane change by the MRM, a steering command to the left toward the first lane 51 or road shoulder 50 side has been issued, so the override threshold value OTe can be set to different values between additive steering that increases steering to the left direction and subtractive steering that decreases the steering angle to the left direction. Not only the steering torque, but also the threshold value may be set to the steering speed and steering angle for each speed.

Operation Takeover at System Failure Occurrence and MRM Activation Flow at Takeover Failure Next, a driving takeover flow (FIG. 4) when a system failure occurs during automated lane change on the highway and an MRM activation flow (FIG. 5) at the time of takeover failure will be described.

(1) Automated Lane Change (PALS Driving)

Figure 4:
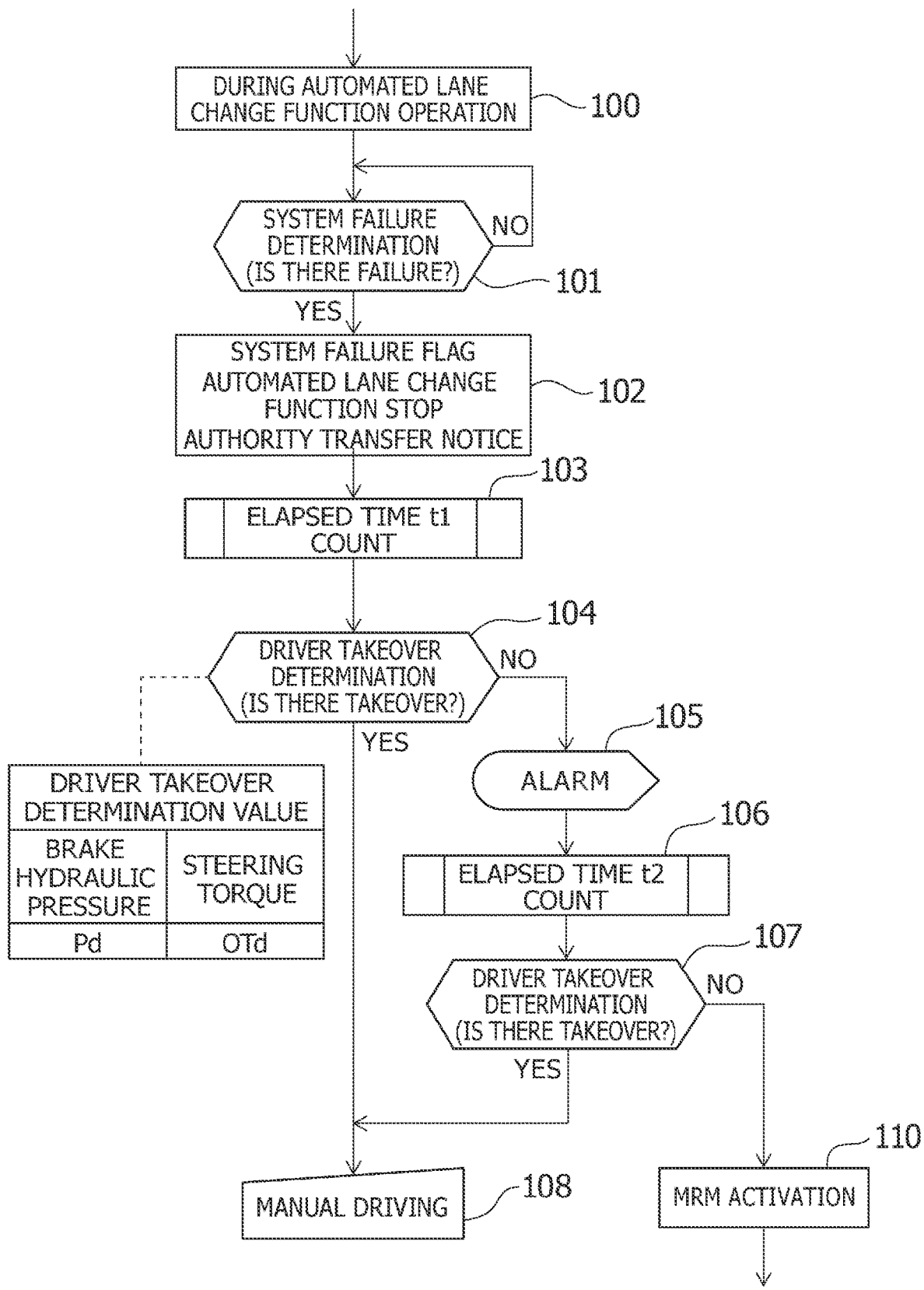
FIG. 4 is a flowchart showing control at a time of automated lane change system failure.

In FIG. 4, during PADS (ACCS and LKAS) driving by the partially automated in-lane driving system on a three-or-more-lane highway on one side, in a situation (automated lane change possible flag is ON) in which it is determined that there is no other vehicle in the front area ZF, rear area ZR, and lateral area ZL of a neighboring lane, automated lane change is performed with the center of the neighboring lane as a target position by a system determination (step 100).

(2) System Failure Determination

During operation of automated in-lane driving (PADS: ACCS and LKAS) and automated lane change (PALS), the automated driving controller 10 constantly determines whether there is a failure or fault in the external sensor 21, internal sensor 22, controllers (14, 15, and 31-33), brake 43, engine 42, steering mechanism 41, and the like (step 101).

(3) System Failure Flag

If it is determined that a system failure has occurred in step 101, a system failure flag is set, and the driver is notified of automated lane change function stop and operation authority transfer (operation takeover request or takeover request) by a head-up display, an information display part in a meter panel, or voice (step 102). At the same time, counting of an elapsed time t1 (for example, ten seconds) after the authority transfer notification is started (step 103).

(4) Driver Takeover Determination

It is determined whether the driver who has received the authority transfer notice has taken over the operation (step 104). That is, it is determined whether brake operation has been performed that has caused an ESP hydraulic command value greater than the brake override threshold value Pd at a normal time or steering has been performed that has caused steering torque greater than the steering override threshold value OTd at a normal time, and if it is determined that the driver has taken over, the operation is shifted to manual driving by the driver's operation (step 108).

(5) Alarm Issuance

On the other hand, if the operation is not taken over within the elapsed time t1 (for example, ten seconds) after the authority transfer notification, an alarm is issued (step 105). Not only an alarm by voice, but also for attracting attention by blinking or the like in the head-up display or the information display part in the meter panel may be used. At the same time, counting of an elapsed time t2 (for example, four seconds) after the alarm issuing is started (step 106).

(6) Driver Takeover Determination

It is determined whether the driver who has received the alarm has taken over operation (step 107). In the same manner as at the time of the authority transfer notice, it is determined whether brake operation has been performed that has caused an ESP hydraulic command value greater than the brake override threshold value Pd at a normal time or steering has been performed that has caused steering torque greater than the steering override threshold value OTd at a normal time, and if it is determined that the driver has taken over, the operation is shifted to manual driving by the driver's operation (step 108).

(7) MRM Activation

On the other hand, if the operation is not taken over within the elapsed time t2 (for example, four seconds) after the alarm sounding, it is determined that the driver has not taken over, and the MRM is activated (step 110).

Figure 5:
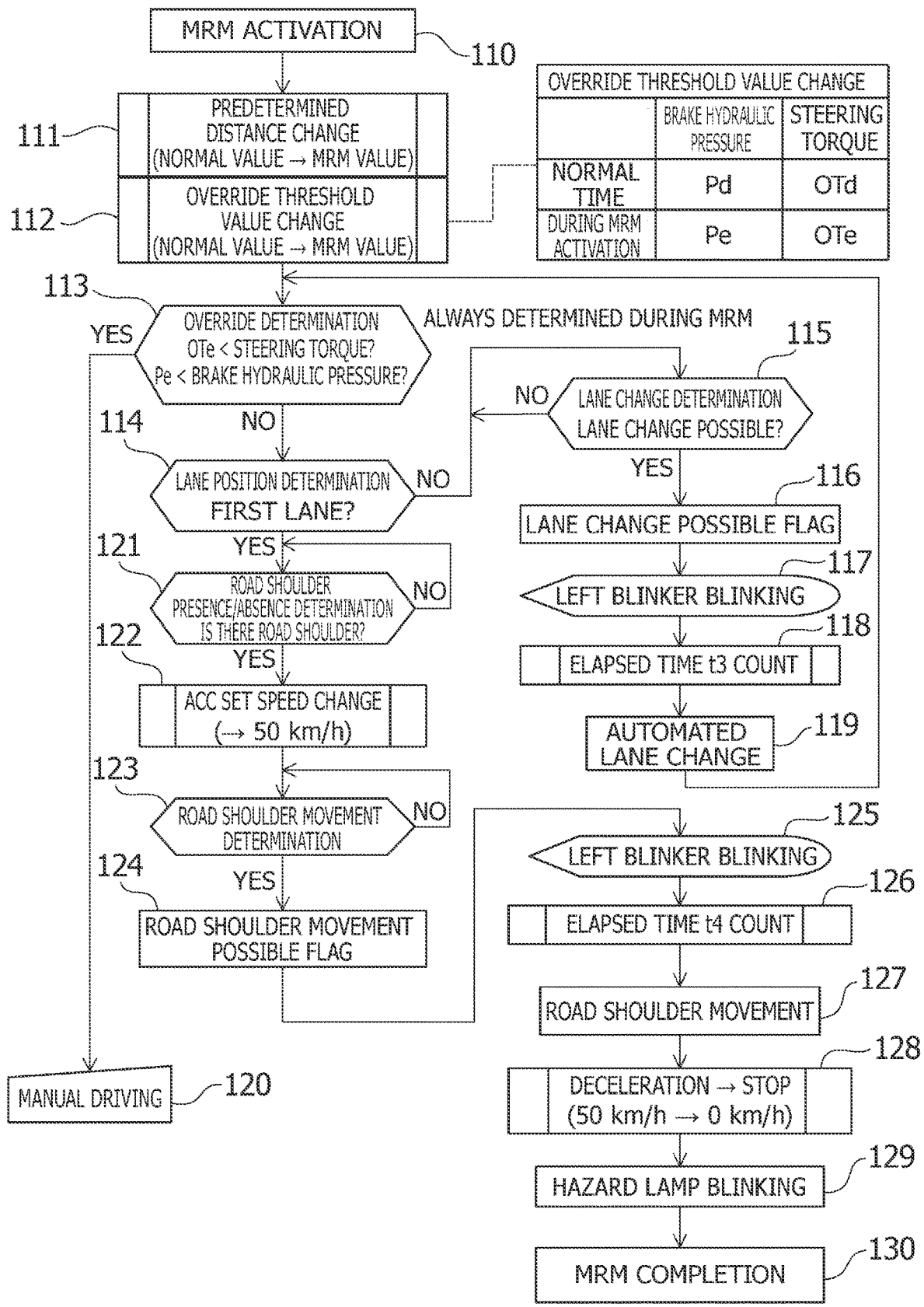
FIG. 5 is a flowchart showing emergency evacuation control of an embodiment of the present invention.

(8) Change of Lane Change Determination Reference Value and Override Determination Reference Value As shown in FIG. 5, when the MRM is activated, a lane change determination reference value and an override determination reference value are changed from normal values to MRM values, such that:

(8-1)

the front and rear predetermined distances (predetermined areas) serving as the lane change criterion are changed from the predetermined areas ZF and ZR (front predetermined distance XF and rear predetermined distance XR) at a normal time to the smaller predetermined areas ZF' and ZR' (front predetermined distance XF' and rear predetermined distance XR') at the MRM activation (step 111);

(8-2)

the brake override threshold value (driver brake operation amount/ESP brake hydraulic pressure) is changed from the brake override threshold value Pd at a normal time to the brake override threshold value Pe (Pe>Pd) at the MRM activation (step 112); and (8-3)

the steering override threshold value (driver steering torque) is changed from the steering override threshold value OTd at a normal time to the steering override threshold value OTe (OTe>OTd) at the MRM activation (step 112).

(9) Override Determination

The override determination is constantly made during the MRM activation (step 113).

If the brake hydraulic pressure by the driver's brake operation>the brake override threshold value Pe or if the driver's steering torque>the steering override threshold value OTe, the MRM is immediately overridden and the operation shifts to manual driving (step 120).

If the brake hydraulic pressure by the driver's brake operation is equal to or less than the brake override threshold value Pe and the driver's steering torque is equal to or less than the steering override threshold value OTe, the MRM is not overridden and continues.

(10) Lane Position Determination

It is determined whether the lane position the vehicle is driving is the first driving lane 51 neighboring the road shoulder 50 (step 114). That is, the environmental condition estimating part 11 determines whether the lane in which the vehicle is driving is the first lane from presence or absence of a neighboring lane, type of lane marking, or the like on the basis of matching between own vehicle position information by the positioning means 24 and the map information 23 and data obtained by the external sensor 21.

(11) Lane Change Flow

When the vehicle is driving in a lane (52 or 53) other than the first driving lane, since lane change to the first driving lane 51 is required, a lane change flow is performed as follows.

(11-1) Lane Change Determination

It is determined whether left lane change can be performed on the basis of whether there is another vehicle in the left front predetermined area ZF' (front predetermined distance XF') or left rear predetermined area ZR' (rear predetermined distance XR') changed in step 111 (step 115). If lane change cannot be performed, ACC driving is continued in the same driving lane.

(11-2) Lane Change Execution

If lane change can be performed, a lane change possible flag is set (step 116), and at the same time, blinking of a left blinker is started (step 117). A blinker blinking time t3 (for example, three seconds) is counted (step 118), and after the elapse of the blinker blinking time t3, left lane change by the automated lane change function is performed (step 119).

(12) Road Shoulder Movement Flow

If the vehicle is determined to be driving in the first driving lane 51 in step 113, the operation moves to a road shoulder movement flow.

(12-1) Road Shoulder Presence/Absence Determination

If the vehicle is determined to be driving in the first lane 51, it is determined whether there is an evacuation space on the road shoulder 50 (step 121). That is, the environmental condition estimating part 11 determines whether there is a road shoulder by matching between the vehicle position information by the positioning means 24 and the map information 23, and sensing of a left area of a left lane marking of the vehicle based on image data or point cloud data obtained by the external sensor 21.

(12-2) ACC Set Speed Change

If it is determined to be possible to evacuate to the road shoulder 50, the ACC set speed is changed to a lower speed, for example, the minimum speed of the highway (50 km/h) for preparation for road shoulder evacuation, and deceleration is started (step 122). At this time, it is desirable to notify surrounding vehicles by an outward HMI or the like that the vehicle is decelerating by the MRM.

(12-3) Road Shoulder Movement Determination

Whether an obstacle is on the road shoulder 50 is sensed to determine whether the vehicle can move to the road shoulder (step 123), and if it is determined to be able to so move, a road shoulder movement possible flag is set (step 124).

(12-4) Left Blinker Blinking

Blinking of a left blinker is started at the same time as the road shoulder movement possible flag (step 125), and a blinker blinking time t4 (for example, three seconds) is counted (step 126).

(12-5) Road Shoulder Movement

After the elapse of the blinker blinking time t4, movement to the road shoulder 50 is performed by the automatic steering function (step 127), after road shoulder movement completion, the target speed is changed to 0 km/h, the vehicle decelerates and stops (step 128), and hazard lamps are made to blink after stopping (step 129).

(13) MRM Completion

The MRM is completed with vehicle speed zero and blinking hazard lamps (step 130).

In the above embodiment, a main line straight section of a highway is assumed, but an override threshold value corresponding to the form, maximum speed, minimum speed, or the like of a road to be driven can be set or selected.

In addition, when there is no following vehicle when the MRM is activated, even if the own vehicle position is in the second lane 52 or third lane 53, the ACC set speed may be set to a lower speed, and deceleration may be started.

Operation and Effects

As detailed above, according to the driving control device for a vehicle according to the present invention, in the vehicle equipped with the partially automated lane change system (PALS), at a time of system failure occurrence, when a driver cannot take over due to the driver dozing off, being ill, being distracted, or the like, and shift to the MRM is performed, (i) if the vehicle is not in the first lane neighboring the road shoulder, ACC driving maintaining (vehicle speed maintaining) the set inter-vehicle distance or the set vehicle speed is continued, and the maintained vehicle speed makes prompt lane change along the traffic flow possible, and (ii) since the predetermined areas serving as the lane change criterion are changed to the second predetermined areas (ZF' and ZR') smaller than in a normal time, opportunities of lane change to the first lane increase and it becomes easy to shift to lane change, a time driving in the second and third lanes is shortened, and as a result, prompt deceleration and stop is expected.

In addition, from the (i), a sudden decrease in vehicle speed is prevented, which also prevents the behavior of the vehicle from becoming unstable or sudden approach to a following vehicle by excessive override of the driver who is agitated by the sudden decrease, and in addition, (iii) excessive override itself of the driver who awakens during the MRM activation is suppressed by change of the override threshold value, which has advantages of preventing the sudden deceleration, sudden steering, unstable behavior of the vehicle, and sudden approach to other vehicles, caused by excessive override.

For example, as shown in FIG. 7A, when the MRM is activated while the vehicle 1 is driving in the second lane 52, although there are following vehicles 4 and 5, ACC driving is continued, approach to the following vehicles 4 and 5 due to deceleration and extension of the rear predetermined area ZR due to deceleration are suppressed, and lane change to the first lane 51 can be promptly executed as shown in FIG. 7B.

As shown in FIG. 8A, when the MRM is activated, the predetermined areas serving as the lane change determination criterion are changed to the predetermined areas ZF' and ZR' (front predetermined distance XF' and rear predetermined distance XR') smaller than the normal time, the lane change possible condition is relaxed, and thereby as shown in FIG. 8B, the following vehicle 5 is not recognized as intrusion to the rear predetermined area ZR' (rear predetermined distance XR'), the vehicle 1 can comfortably perform lane change to the first lane 51 and shorten time driving in the second lane 52, and prompt deceleration and stop is expected.

Since when the MRM is activated, the brake override threshold value (Pd) and the steering override threshold value (OTd) are changed to values (Pe and OTe) greater than at a normal time, excessive override by the driver who awakens during the MRM activation is suppressed, unstable behavior of the vehicle 1 due to excessive left steering override OL as shown in FIG. 8A and right steering override OR and approach to the following vehicle 4 due to excessive brake override OB are prevented, and lane change to the first lane 51 can be continued as shown in FIG. 9B.

Although some embodiments of the present invention have been described above, the present invention is not limited to the embodiments, and various modifications and changes are possible within the scope of the present invention.

The invention claimed is:

1. A driving control apparatus for a vehicle, comprising:
an environmental condition estimating part including a surrounding recognition function for recognizing a vehicle's driving lane, neighboring lanes, and other vehicles driving in the driving lanes and a function for obtaining the vehicle's moving state;
a path generating part for generating a target path on the basis of information obtained by the environmental condition estimating part; and
a vehicle control part configured to perform speed control and steering control for making the vehicle follow the target path, wherein the driving control apparatus having:

a function for performing automated in-lane driving by maintaining a set vehicle speed when there is no preceding other vehicle in the vehicle's driving lane, and maintaining a set inter-vehicle distance when there is a preceding other vehicle;

a function for performing automated lane change to a neighboring lane when there is no other vehicle in a predetermined area of the neighboring lane;

a function for notifying a driver of stopping the functions and an operation takeover request when a system failure occurs during operation of the functions; and a function for evacuating the vehicle to a road shoulder when the driver cannot take over operation at the notification, wherein the driving control apparatus is configured to, in a case in which the vehicle is not in a first lane neighboring the road shoulder at operation of the function for evacuating, perform the lane change from in-lane driving maintaining the set inter-vehicle distance or the set vehicle speed to the first lane, and prior thereto, the predetermined area serving as a criterion of the lane change to the first lane is changed to a second predetermined area smaller than the predetermined area of the automated lane change.

2. The driving control apparatus for the vehicle according to claim 1, wherein after the lane change to the first lane, the set vehicle speed is changed to an evacuation speed lower than the set vehicle speed, causing deceleration until the evacuation speed while driving in the first lane.

3. The driving control apparatus for the vehicle according to claim 1, wherein during operation of the function for evacuating, a threshold value serving as a criterion of brake override for stopping the function is changed to a value greater than at non-operation of the function for evacuating.

4. The driving control apparatus for the vehicle according to claim 1, wherein during operation of the function for evacuating, a threshold value serving as a criterion of steering override for stopping the function is changed to a value greater than at non-operation of the function for evacuating.

* * * * *